United States Patent
Forsyth

(10) Patent No.: US 7,779,768 B2
(45) Date of Patent: Aug. 24, 2010

(54) APPARATUS AND METHOD TO IMPROVE FIELD APPLICATION OF ANHYDROUS AMMONIA IN COLD TEMPERATURES

(76) Inventor: Daniel L. Forsyth, 630 Seventh St., SE., Oelwein, IA (US) 50662

( * ) Notice: Subject to any disclaimer, the term of this patent is extended or adjusted under 35 U.S.C. 154(b) by 807 days.

(21) Appl. No.: 11/259,715

(22) Filed: Oct. 27, 2005

(65) Prior Publication Data

US 2007/0022927 A1    Feb. 1, 2007

Related U.S. Application Data

(60) Provisional application No. 60/623,888, filed on Nov. 1, 2004.

(51) Int. Cl.
*A01C 23/00* (2006.01)
(52) U.S. Cl. ...................................... 111/119
(58) Field of Classification Search ................. 111/119, 111/118, 127
See application file for complete search history.

(56) References Cited

U.S. PATENT DOCUMENTS

| | | | | |
|---|---|---|---|---|
| 4,069,029 A * | 1/1978 | Hudson | .......... | 62/50.5 |
| 4,385,500 A * | 5/1983 | Kjelgaard et al. | ............ | 62/50.5 |
| 4,903,618 A * | 2/1990 | Blair | .......... | 111/118 |
| 5,178,078 A * | 1/1993 | Pendergrass | ............ | 111/128 |
| 5,890,445 A * | 4/1999 | Ridgley | ............ | 111/119 |
| 5,967,066 A * | 10/1999 | Giles et al. | ............ | 111/119 |
| 6,269,757 B1 * | 8/2001 | Kiest | ............ | 111/119 |

\* cited by examiner

*Primary Examiner*—Christopher J. Novosad
(74) *Attorney, Agent, or Firm*—Allan L. Harms; Shuttleworth & Ingersoll, PLC

(57) ABSTRACT

Apparatus and method to improve flow of liquid anhydrous ammonia from a portable liquid $NH_3$ tank in cold temperatures includes an air compressor coupled to the vapor port of a portable liquid $NH_3$ tank used to supply liquid anhydrous ammonia to an anhydrous ammonia fertilizer applicator. The air compressor injects compressed air into the tank to maintain head pressure within the tank at between 80 and 150 psi. to facilitate flow of liquid $NH_3$ from the tank to the applicator when atmospheric temperatures are low as well as when the level of liquid $NH_3$ present in the tank declines.

13 Claims, 2 Drawing Sheets

APPARATUS AND METHOD TO IMPROVE FIELD APPLICATION OF ANHYDROUS AMMONIA IN COLD TEMPERATURES

CROSS-REFERENCE TO RELATED APPLICATIONS

This application claims priority from copending provisional patent application entitled "Apparatus and Method to Improve Field Application of Anhydrous Ammonia in Cold Temperatures", Ser. No. 60/623,888 filed Nov. 1, 2004. The disclosure of provisional patent application Ser. No. 60/623,888 is hereby incorporated in its entirety.

BACKGROUND OF THE INVENTION

The present invention pertains to applicators for injection of anhydrous ammonia ($NH_3$) into soil as a fertilizer.

In the application of anhydrous ammonia as a fertilizing agent, it is usual to utilize an applicator which includes a number of injection knives which are drawn on a tool bar with each knife making a small furrow in the soil. A conduit to carry anhydrous ammonia ($NH_3$) is carried on each knife shank and terminates at the lower end of the knife, thereby permitting a stream of $NH_3$ to be inserted in the furrow. The furrow is then closed, trapping the $NH_3$ in the soil.

For purposes of supplying an anhydrous ammonia applicator, a portable tank containing liquid $NH_3$ under pressure is drawn behind the applicator and $NH_3$ from the tank is permitted to escape through a liquid conduit which couples to a control/distribution unit which distributes $NH_3$ to the knives on the applicator. The $NH_3$ is forced from the tank by vapor pressure within the tank in the vapor head above the liquid level of the tank. As the tank empties or as atmospheric temperatures decline, the head pressure declines and less pressure is available in the tank to urge liquid $NH_3$ into the liquid conduit.

In addition to having a port for intake or discharge of liquid pressurized $NH_3$, portable tanks for transport of liquid $NH_3$ include a vapor port which communicates with the interior of the tank and is controlled by a shut off valve to prevent escape of $NH_3$ gas from the tank. When liquid $NH_3$ is being pumped into a portable tank, a vapor hose is connected to the vapor port on the tank and its shut off valve opened in order to allow movement of gaseous $NH_3$ from the tank while liquid $NH_3$ is being pumped into the tank. The vapor being allowed to exhaust from the tank is ported back to the main $NH_3$ supply container.

When $NH_3$ is being applied to a field, the head pressure of the $NH_3$ vapor in the tank forces liquid $NH_3$ from the tank. As the atmospheric temperature drops, the pressure of the gaseous $NH_3$ in the pressure head of a portable $NH_3$ tank drops, providing less pressure on the liquid $NH_3$ in the tank resulting in the slowing movement of the liquid $NH_3$ from the tank and into the ducts carried on the applicator knives. For example, at an outdoor temperature of 30° F., the pressure may only be forty pounds per square inch. This is a pronounced problem for application of $NH_3$ fertilizer because application is preferably accomplished in the fall season, after harvest of grain crops from the field. Therefore, $NH_3$ application on a cold day is slowed and may become erratic because insufficient pressure remains in the pressure head of the portable tank to supply a steady stream of liquid $NH_3$. Additionally, as the $NH_3$ portable tank is emptied, the pressure of the head declines and liquid $NH_3$ is discharged more slowly even if atmospheric temperatures are summer like. To adjust for the problem of low head pressure, the operator of the fertilizer applicator must slow greatly to be sure adequate $NH_3$ is being applied to the soil. This need substantially reduces productivity of the application equipment and the operator.

Previous efforts to overcome the problem of reduced flow of liquid $NH_3$ when the atmospheric temperature is low include increasing the size of the liquid conduit from the tank, drawing from two or more tanks at the same time, and drawing liquid $NH_3$ from a port in the bottom of the tank instead of from the standard dip tube provided on the top of the tank. These methods provide additional shortcomings or are ineffective. Drawing a second or third tank over the soil causes increased fuel consumption of the tractor or other power unit, as well as increasing compaction of the soil from additional wheels passing over the soil. Adding a bottom port to a standard dip tube equipped tank adds expense and increases the possibility for leakage from the tank, while doing little to solve the problem.

A method to maintain a preset pressure in the pressure head of the portable $NH_3$ tank would be very desirable for use by operators of $NH_3$ application equipment.

BRIEF SUMMARY OF THE INVENTION

The present invention provides a solution to the problem of reduced head pressure in a portable anhydrous ammonia transport tank supplying an anhydrous ammonia fertilizer applicator. An air compressor is coupled to the vapor port of the portable $NH_3$ tank to cause increase of the pressure in the pressure head in the portable $NH_3$ tank as needed, particularly when the atmospheric temperature is low or the liquid $NH_3$ level is low, which results in a reduced pressure of the $NH_3$ vapor present above the liquid $NH_3$ in the tank. A regulator controls the flow of air under pressure being injected through the vapor port into the tank such that the pressure in the pressure head can be maintained at least approximately 80 psi under all conditions. As the atmospheric temperatures varies on an autumn day, the pressure regulator will control the pressure of the vapor head in the tank, causing the compressor to operate as needed to maintain a desired pressure.

The invention includes an air compressor which is driven by power supplied by the tractor pulling the $NH_3$ applicator, and therefore preferably, the air compressor is hydraulically driven. A compressed air hose or pipe couples the output of the compressor to the vapor port of the portable $NH_3$ tank. A pressure regulator controls the level of pressure in the pressure head in the tank by selective addition of compressed air to the pressure head. The compressed air could be substituted with another gaseous working fluid such as nitrogen or carbon dioxide. However, compressed air works satisfactorily and creates no hazards and is therefore obviously the working fluid of choice.

Though a hydraulically powered air compressor may be used, an air compressor powered by other power sources may be used. Furthermore, some power units may be equipped with an air compressor capable of providing a sufficient supply of compressed air without addition of an air compressor to the application equipment. Because a relatively low pressure compressor is needed, the compressor can easily be carried on the fertilizer applicator, the portable tank, or the power unit.

It is accordingly a primary object of the invention to provide a method to maintain the head pressure within a portable anhydrous ammonia tank used to supply a fertilizer application device so that sufficient flow of $NH_3$ continues regardless of the atmospheric temperature at the time the application device is used.

It is additionally an object of the invention to provide apparatus which prevents the slowing of flow of liquid $NH_3$ from a portable tank used to supply liquid NH$_3$ to an applicator which injects the NH$_3$ into the soil.

It is a further object of the invention to provide a method and apparatus to maintain the efficient application of anhydrous ammonia fertilizer in a range of atmospheric temperatures encountered in the autumn season.

It is also an object of the Invention to maintain vapor head pressure in a portable NH$_3$ tank within the range of 80 to 150 psi regardless of the liquid NH$_3$ level or the atmospheric temperature. These and other objects of the invention will become apparent from examination of the detailed description of the invention which follows.

DETAILED DESCRIPTION OF THE INVENTION

Figure 1:
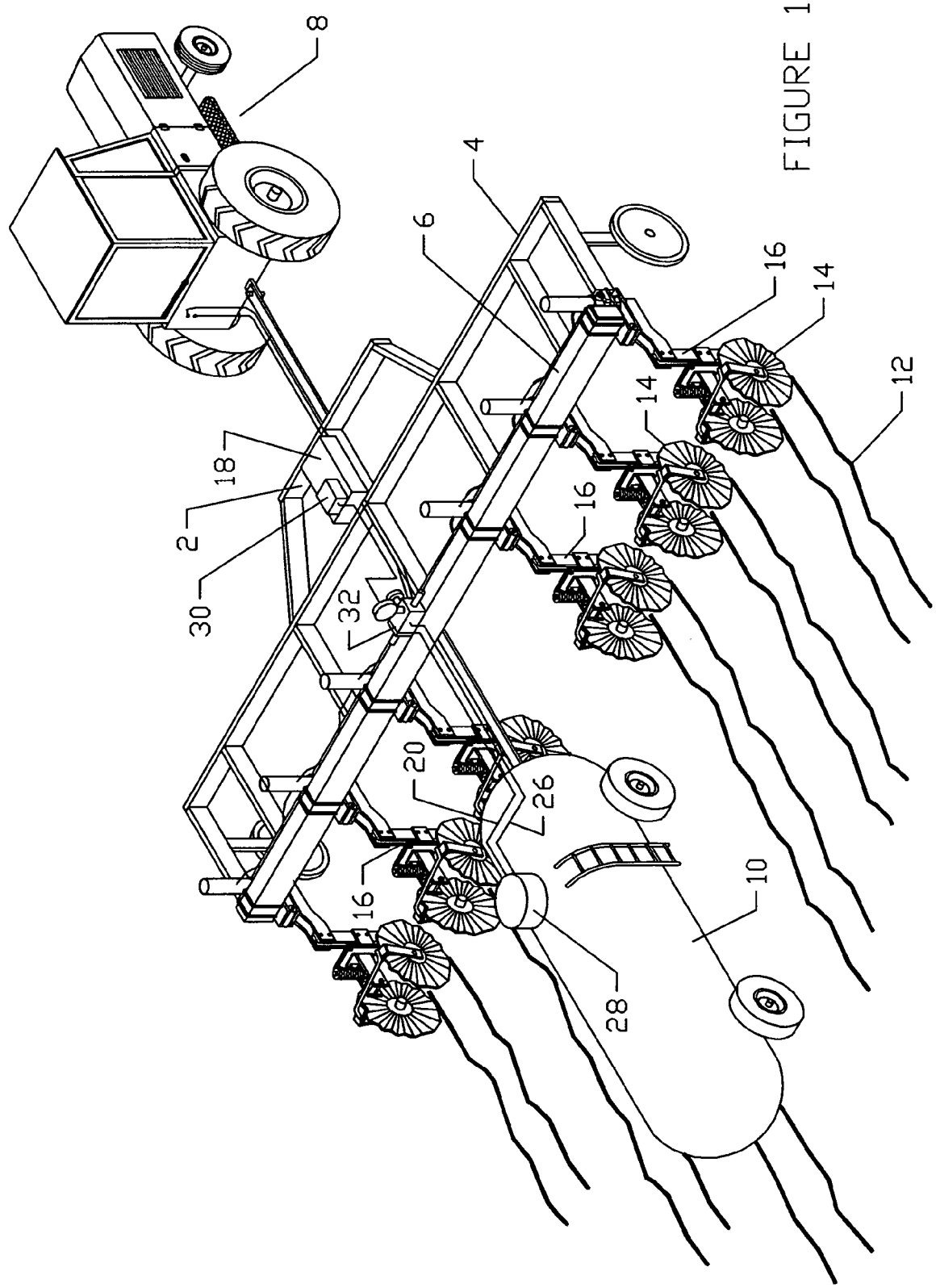
FIG. 1 is a perspective view of an exemplary NH$_3$ applicator and supply tank according to the invention, being drawn over a field by a tractor.

FIG. 1 discloses a tractor 8 drawing an applicator 4 over soil 12. Portable tank 10 is also drawn by tractor 8, with tank 10 following applicator 4. Applicator 4 comprises a tool bar 6 on which are mounted soil interrupting knives 16 which are followed by paired coulters 14. Liquid anhydrous ammonia (NH$_3$) within tank 10 is distributed to knives 16 and the liquid NH$_3$ is injected into soil 12 behind each of knives 16 as knives 16 create shallow trenches by movement of knives 16 through soil 12. The trenches are closed by the pairs of coulters 14 associated with each of the knives 16.

Figure 2:
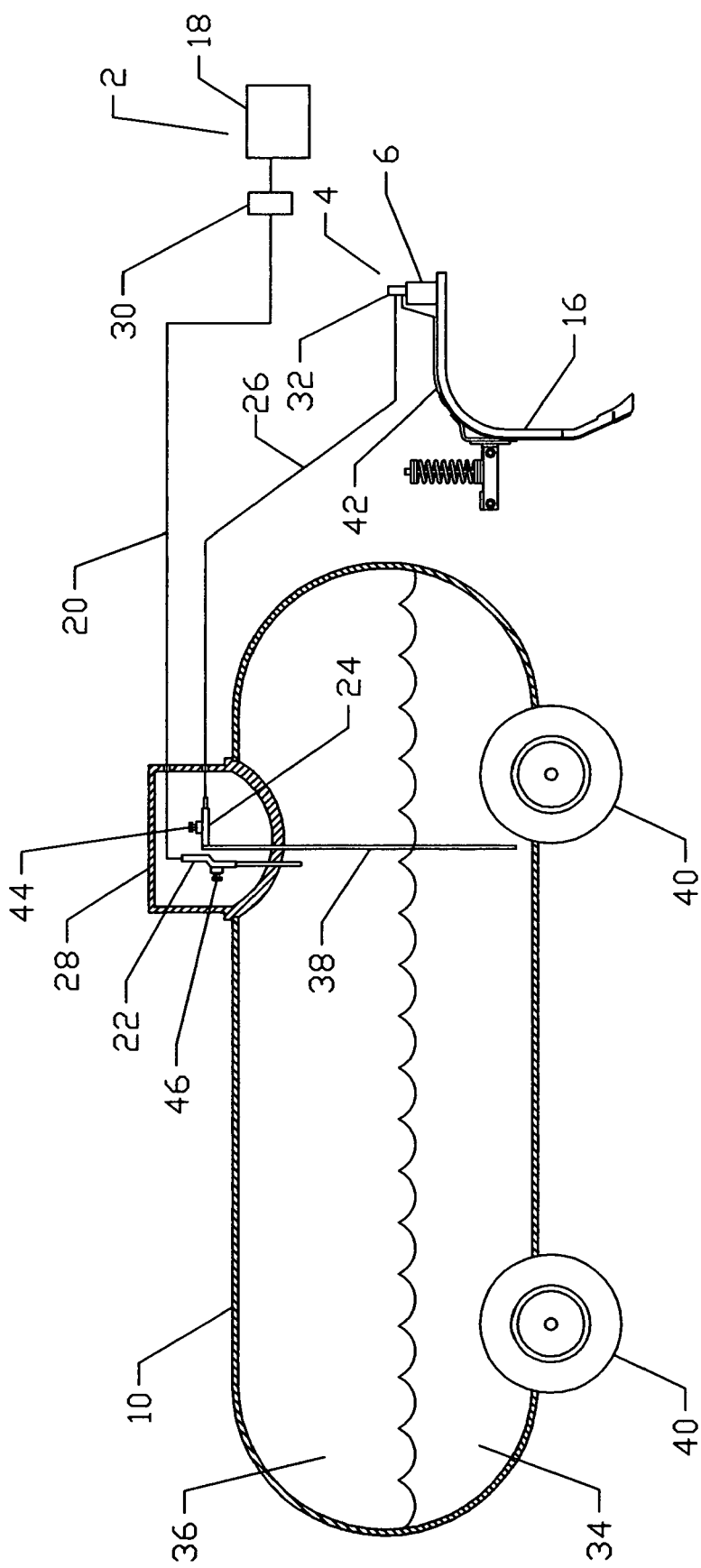
FIG. 2 is a schematic representation of the NH$_3$ application system of the present invention.

Referring now to both FIGS. 1 and 2, invention 2 comprises compressor 18 which is coupled by compressed gas duct 20 to vapor port 22 of tank 10. Compressor 18 compresses a gas, preferably air, though other gases may be used, and the compressed gas is delivered by compressed gas duct 20 to vapor port 22 where the compressed gas enters tank 10 and is joined with NH$_3$ vapor in the pressure head 36 above the liquid NH$_3$ 34 present in tank 10.

Head pressure within tank 10 forces liquid NH$_3$ to exit tank 10 through liquid port 24 and to pass through liquid pipe 26 to be distributed to knife ducts 42 leading down each of knives 16. A pressure regulator 30 may be connected to duct 20 such that pressure in duct 20 and therefore within the pressure head 36 of tank 10 may be monitored and maintained at a preselected pressure, preferably approximately 80-150 psi and more preferably approximately 100 psi. When the vapor pressure in the pressure head 36 within tank 10 drops below the preselected pressure, flow of liquid NH$_3$ from tank 10 will be slowed. When pressure below the preselected pressure is detected by regulator 30, the compressor 18 may be activated and compressed gas forced into tank 10 up to the preselected pressure. With the increased head pressure within tank 10, liquid NH$_3$ will flow more quickly to knives 16 such that the tractor 8 may draw the applicator 4 over the field at a desired speed and will not be required to slow to allow for adequate NH$_3$ to reach soil 12.

FIG. 2 schematically illustrates the structure of the invention. A liquid NH$_3$ storage tank 10 carried on wheels 40 contains a quantity of liquid NH$_3$ 34 therein. Above the surface of the liquid NH$_3$ 34, there is a pressure head 36 of gases, including NH$_3$ in vapor state. The tank 10 is provided with a liquid port 24 and a vapor port 22 which may be housed under a moveable valve cover 28. When the portable tank 10 is to be filled at a NH$_3$ supply facility, a liquid duct from a bulk supply reservoir (not illustrated) is coupled to the liquid port 24 and vapor pressure building in the tank 10 is vented through vapor port 22 to the bulk supply reservoir through suitable vapor duct means (also not illustrated in the drawings).

When the portable tank 10 is attached to fertilizer applicator 4 and both are driven over a field, liquid NH$_3$ is forced from the tank 10 by pressure of vapor in pressure head 36 so that liquid NH$_3$ will flow to knife ducts 42 through liquid pipe 26. As the environmental temperature drops, the vapor pressure of NH$_3$ in the pressure head 36 of tank 10 declines, reducing the speed of transfer of liquid NH$_3$ 34 to the applicator 4. Therefore, compressor 18 may be operated to compress air to be injected through vapor port 22 into pressure head 36 of tank 10 which will force liquid NH$_3$ 34 from tank 10 at a sufficient transfer rate for efficient application speed to be maintained.

Similarly, as the tank 10 empties of liquid NH$_3$, the pressure in pressure head 36 declines and compressor 18 may be operated to compress air to be injected through vapor port 22 into pressure head 36 of tank 10 which will force liquid NH$_3$ 34 from tank 10 fast enough for efficient application speed to be maintained.

A manually operated liquid valve 44 is available to stop flow of liquid NH$_3$ from tank 10 via liquid pipe 26. A manually operated vapor valve 46 is provided to stop flow of vapor from tank 10. These elements are standard on portable NH$_3$ tanks.

Compressed gas duct 20 couples vapor port 22 of tank 10 to compressor 18. Compressor 18 compresses a fluid, preferably air, and may be driven by a hydraulic motor which may be conveniently powered from the hydraulic fluid pumping system available on a standard farm tractor. Compressor 18 may alternately be powered by a separate gas engine or from other power sources and may be substituted with a pressurized storage tank of compressed gas. Some tractors or power units provide an onboard source of compressed air which may be used to pressurize pressure head 36.

The compressor 18 may be mounted to the tractor or to the applicator 4 or to the tank 10 at a convenient location which permits compressor 18 to be powered and to convey compressed air (or other gaseous fluid) to the vapor port 22 of tank 10 through compressed gas duct 20. A pressure regulator 30 may be optionally used to monitor and regulate the pressure of compressed air in the pressure head 36 of tank 10. The pressure regulator 30 may signal the compressor 18 to operate within a preselected range of pressures. A pressure of approximately 80-150 psi in pressure head 36 is found to be satisfactory to force liquid NH$_3$ 34 from tank 10 via dip tube 38 to NH$_3$ control unit 32 to supply liquid NH$_3$ to each knife duct 42 for incorporation in the soil as knife 16 of applicator 4 is drawn through the soil.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

Having described the invention, I claim:

1. Apparatus to apply liquid anhydrous ammonia to soil of a field comprising
an anhydrous ammonia applicator moveable over the field,
a portable tank containing liquid anhydrous ammonia coupled to the anhydrous ammonia applicator,
a source of compressed gas coupled to a port on the portable tank containing liquid anhydrous ammonia,
control apparatus coupled to the source of compressed gas,
the control apparatus selectively supplying compressed gas from the source of compressed gas to the port on the portable tank when vapor pressure in a pressure head in the portable tank containing liquid anhydrous ammonia drops below a preselected pressure.

2. The apparatus of claim 1 wherein
the source of compressed gas is a compressor,
the compressor is selectively operated when the vapor pressure in the pressure head in the portable tank containing liquid anhydrous ammonia drops below the preselected pressure.

3. The apparatus of claim 1 wherein
the source of compressed gas is an air compressor,
the compressed gas is compressed air.

4. The apparatus of claim 3 wherein
a pressure regulator is coupled to the air compressor,
the pressure regulator activating the air compressor when vapor pressure in the tank falls below about 80 psi.

5. The apparatus of claim 4 wherein
the pressure regulator deactivates the air compressor when vapor pressure in the tank exceeds about 150 psi.

6. The apparatus of claim 1 wherein
the control apparatus comprises a pressure regulator coupled to the source of compressed gas,
the pressure regulator monitoring pressure in the vapor head of the tank,
the compressed gas is compressed air,
the pressure regulator operative to cause an air compressor to supply compressed air to the tank to increase pressure in the vapor head.

7. The apparatus of claim 1 wherein
the tank is supported on wheels and is drawn by the anhydrous ammonia applicator,
the compressed gas is compressed air,
the source of compressed gas is an air compressor,
the air compressor is coupled to a vapor port on the tank,
the applicator is drawn over the field by a power unit,
the anhydrous ammonia applicator comprises at least one injection knife,
a liquid duct associated with the at least one injection knife,
the liquid duct coupled to a liquid port on the tank,
the liquid duct discharges liquid anhydrous ammonia near a lower end of the at least one injection knife,
the control apparatus comprises a pressure regulator,
the pressure regulator is coupled to the air compressor,
the pressure regulator activating the air compressor when vapor pressure in the tank falls below about 80 psi,
the pressure regulator deactivating the air compressor when vapor pressure in the tank exceeds about 150 psi.

8. The apparatus of claim 1 wherein
the source of compressed gas is coupled to a vapor port on the portable tank containing liquid anhydrous ammonia.

9. Apparatus to apply liquid anhydrous ammonia to soil of a field comprising
an anhydrous ammonia applicator moveable over the field,
the anhydrous ammonia applicator comprising soil penetrating knives and liquid ducts attached to the knives,
the knives being drawn through the soil while liquid anhydrous ammonia passes through the ducts,
a tank containing liquid anhydrous ammonia coupled to the anhydrous ammonia applicator,
the tank comprising a vapor head therein, the vapor head disposed above a liquid surface of the liquid anhydrous ammonia,
the vapor head comprising gaseous anhydrous ammonia,
a source of compressed gas coupled to a port on the portable anhydrous ammonia tank,
the port communicative with an interior of the tank,
a controller coupled to the source of compressed gas,
the controller controlling addition of compressed gas to the vapor head,
the controller monitoring a head pressure in the vapor head,
the controller selectively operative to add compressed gas to the vapor head when a preselected minimum head pressure in the vapor head is detected by the controller,
liquid hydrous ammonia is urged from the tank by the head pressure in the vapor head.

10. The apparatus of claim 9 wherein
the source of compressed gas is an air compressor,
the air compressor being a part of a power unit drawing the anhydrous ammonia applicator over the field.

11. The apparatus of claim 9 wherein
the source of compressed gas is an air compressor,
the controller is a pressure regulator,
the controller operative to activate the air compressor when pressure in the vapor head drops below approximately 100 psi.

12. The apparatus of claim 9 wherein
the source of compressed gas is an air compressor,
the controller is a pressure regulator,
the controller operative to activate the air compressor when pressure in the vapor head drops below approximately 80 psi.

13. The apparatus of claim 9 wherein
the controller deactivating the source of compressed gas when pressure in the pressure head exceeds approximately 150 psi.

* * * * *